United States Patent [19]
Dougherty et al.

[11] Patent Number: 5,391,223
[45] Date of Patent: Feb. 21, 1995

[54] METALLIZATION COMPOSITIONS FOR BI AND PB-CONTAINING CERAMIC DIELECTRICS

[75] Inventors: Joseph P. Dougherty; Sea-Fue Wang, both of State College, Pa.; Wayne Huebner, Rolla, Mo.

[73] Assignee: The Penn State Research Foundation, University Park, Pa.

[21] Appl. No.: 110,039

[22] Filed: Aug. 20, 1993

[51] Int. Cl.$^6$ .............................................. C23C 20/04
[52] U.S. Cl. ................................. 106/1.19; 106/1.05; 420/505; 428/469
[58] Field of Search ..................... 106/1.19, 1.14, 1.15, 106/1.05, 286.1, 286.2, 286.4; 420/463, 505, 580; 428/469

[56] References Cited

U.S. PATENT DOCUMENTS

| | | | |
|---|---|---|---|
| 3,896,054 | 7/1975 | Larry | 106/1.14 |
| 4,001,146 | 1/1977 | Horowitz | 106/1.15 |
| 4,090,009 | 5/1978 | Horowitz | 106/1.19 |
| 4,394,171 | 7/1983 | Nair | 106/1.19 |
| 4,954,926 | 9/1990 | Pepin | 361/304 |

OTHER PUBLICATIONS

PZT–Based Multilayer Piezoelectric Ceramics with AgPd–Internal Electrodes–Ferroelectrics, 1988, vol. 87, pp. 271–294 Wang et al. No Month.
Interaction of Silver/Palladium Electrode Systems with Flux-Sinter Barium Titanate Dielectrics–A Thesis in Ceramic Science by Sea-Fue Wang, Dec., 1991.

*Primary Examiner*—Mark L. Bell
*Assistant Examiner*—Deborah Jones
*Attorney, Agent, or Firm*—Thomas J. Monahan

[57] ABSTRACT

It has been newly determined that in a reaction of an Ag/Pd metallization with Pb from a lead-based ceramics, a maximum solubility of Pb is observed of approximately 14% (atomic percent). By inclusion of an effective amount of Pb in the Ag/Pd metallization, leaching of Pb from a Pb-based ceramic is either reduced or eliminated. Thus, upon firing, the metallization exhibits an equilibration which prevents Pb from being drawn out of the underlying ceramic. Similarly, Ag/Pd metallization shows a maximum solubility of 16 atomic percent for Bi in Bi-based ceramics. Inclusion of an effective amount of Bi in the metallization prevents a Bi leaching from an underlying ceramic.

5 Claims, 7 Drawing Sheets

5,391,223

METALLIZATION COMPOSITIONS FOR BI AND PB-CONTAINING CERAMIC DIELECTRICS

FIELD OF THE INVENTION

This invention relates to metallization compositions for bismuth and lead-containing ceramic dielectrics, and more particularly, to improved metallization compositions which prevent a depletion of bismuth or lead at a metallization/ceramic interface and a resultant alteration of the ceramic's dielectric properties.

BACKGROUND OF THE INVENTION

Multi-layer capacitors (MLC's) and multi-layer actuators employ high permittivity dielectrics with interspersed high temperature metallizations. In such structures, the formation of low permittivity phases at metallization/ceramic interfaces, low melting temperature phases and interdiffusion of components have created impediments to improved device performance. Those problems have become more significant as industry continues to drive towards reducing internal electrode thicknesses without sacrificing yield or reliability. Combined with the use of flux-sintered dielectrics and Pb-based ferroelectrics, the chemical reactions which may occur between electrodes and the dielectric have thus become more critical.

During co-firing of a dielectric with a metal, the potential for mechanical and chemical interactions and their influence on electrical performance must be carefully considered. Mechanical considerations encompass expansion/contraction due to the oxidation/reduction of the internal electrode, shrinkage mismatch during sintering, and ΔCTE (co-efficient of thermal expansion) during cooling and operation. With regard to chemical interactions, the formation of low permittivity or lossy phases at the interface, low melting eutectic phases, and interdiffusion of components are the major concerns. Such may not only directly impact the presence of undesirable phases, but may also significantly alter microstructural evolution and the defect chemistry of the dielectric. They adversely affect electrical performance and reliability.

BaTiO$_3$-based MLC dielectrics with Ag/Pd electrodes, commonly employ fluxes of Bi$_2$O$_3$ and PbO. Not only do those fluxes promote low temperature densification due to transient liquid phase sintering, but they also favorably tailor dielectric properties by entering into solid solution at higher temperatures. Of the two, however, Bi$_2$O$_3$ has been recognized as creating a problem when co-fired with Pd-containing electrodes, i.e., the so-called "bismuth reaction." This reaction has been proposed to occur as:

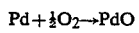

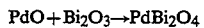

or alternately:

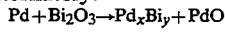

The problem with PdBi$_2$O$_4$ is that it decomposes at ≈835° C. to PdO and Bi$_2$O$_3$; the PdO immediately reduces to Pd, and the Bi$_2$O$_3$ melts. As Pd$_x$Bi$_y$ intermetallics melt at very low temperatures and do not wet the dielectric, both reactions may result in electrode discontinuities, microcracking and voids. The addition of Ag or Au or Pt with the Pd has been shown to minimize the bismuth reaction due to the lowered activity of the Pd.

It also has been shown that the reaction of PdO and PbO results in PdPbO$_2$ formation. PdPbO$_2$ also decomposes at ≈830° C. to form PdO which immediately reduces, and PbO, which melts at ≈860° C.

The formation of PbO at a metallization/ceramic interface results in formation of an altered chemistry dielectric that substantially reduces the dielectric properties of the underlying ceramic. Such effects have been observed by Wersing et al. and reported in "PZT-Based Multi-Layer Piezo-Electric Ceramics with AgPd-Internal Electrodes", Ferroelectrics, 1988, volume 87, pages 271–294, at 277.

Accordingly, it is a principal object of this invention to provide an improved MLC structure wherein reactions are minimized between the metallization and the dielectric.

It is a further object of this invention to provide an improved metallization composition for use with Pb-containing dielectrics.

It is a still further object of this invention to provide an improved metallization composition for use with Bi-containing dielectrics.

It is yet another object of this invention to provide an Ag/Pd metallization system that prevents a leaching of Pb from an underlying Pb-containing dielectric.

SUMMARY OF THE INVENTION

It has been newly determined that in a reaction of an Ag/Pd metallization with Pb from a lead-based ceramic, a maximum solubility of Pb is observed of approximately 14% (atomic percent). By inclusion of an effective amount of Pb in the Ag/Pd metallization, leaching of Pb from a Pb-based ceramic is either reduced or eliminated. Thus, upon firing, the metallization exhibits an equilibration which prevents Pb from being drawn out of the underlying ceramic. Similarly, Ag/Pd metallization shows a maximum solubility of 16 atomic percent for Bi in Bi-based ceramics. Inclusion of an effective amount of Bi in the metallization prevents a Bi leaching from an underlying ceramic.

DETAILED DESCRIPTION OF THE INVENTION

As will become apparent from the detailed experimental evidence presented below, studies were undertaken of the reactions between silver/palladium solid solutions, lead oxide and bismuth and lead based ceramics. It has been found that the solubility of lead in alloys of silver/palladium containing a 35% (or more) mole fraction of palladium, varies approximately linearly at temperatures in excess of 800° C. In such alloys, the solubility of lead in a silver/palladium solid solution is found to be directly dependent upon the amount of included palladium and is at a maximum at approximately 14 atomic percent (or 28% by weight) of the amount of palladium in the alloy.

With respect to the solubility of bismuth into a solid solution of silver/palladium, it too was found to exhibit a linear solubility function at temperatures in excess of 800° C. and at a mole fraction of palladium of 40% or more. It was found that Bismuth solubility varies with the amount of palladium, to a maximum ratio of approximately 16 atomic percent ("at %").

The specific solubility values (approximate), of Bi and Pb in Ag/Pd are given in Table 1.

TABLE 1

Ag/Pd Metallization Ratios Showing Maximum Pb and Bi Solubilities

| MOLE FRACTION OF AG | Pb in Pd/Ag (at %) | Bi in Pd/Ag (at %) |
| --- | --- | --- |
| 0.000 (pure Pd) | 14.000 | 16.00 |
| 0.100 | 12.000 | 14.000 |
| 0.200 | 10.000 | 10.000 |
| 0.300 | 8.000 | 7.000 |
| 0.400 | 5.500 | 4.500 |
| 0.500 | 3.000 | 1.500 |
| 0.600 | 1.500 | 0.200 |
| 0.700 | 0 | 0 |
| 0.800 | 0 | 0 |
| 0.900 | 0 | 0 |
| 1.000 (pure Ag) | 0 | 0 |

Figure 1:
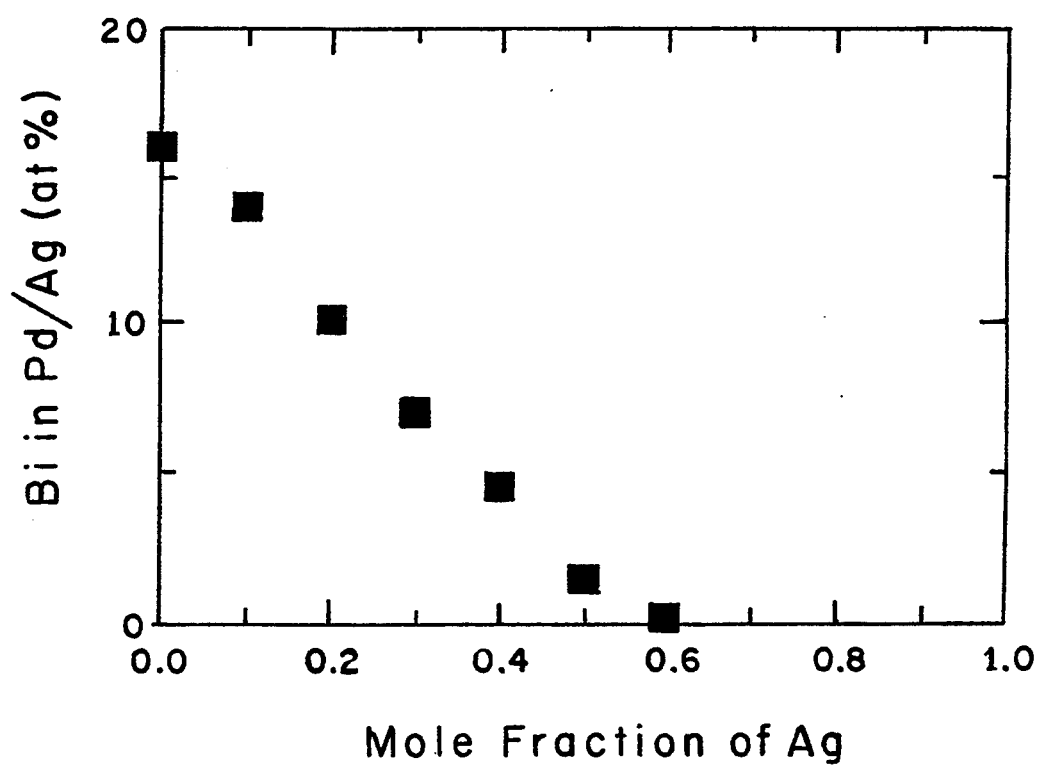
FIG. 1 is a chart of solubility of Bi in a Pd/Ag solid solution, as Ag is varied.
Figure 2:
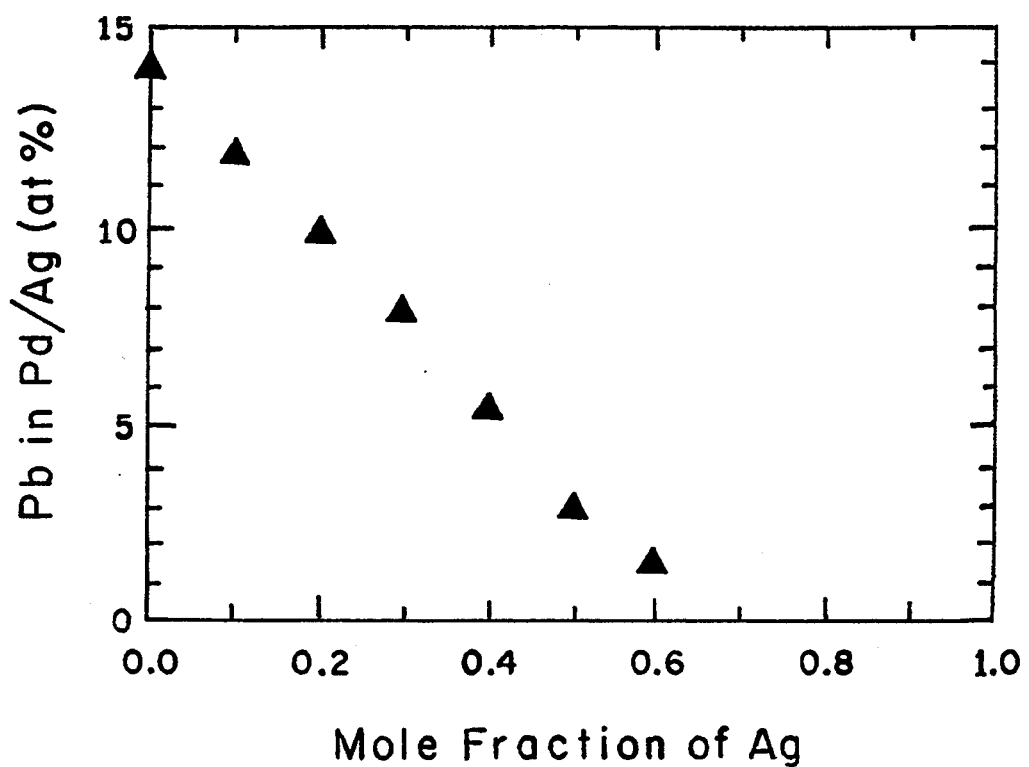
FIG. 2 is a chart of the solubility of Pb in a Pd/Ag solid solution, as Ag is varied.

FIGS. 1 and 2 are plots showing the approximate linear variations of Bi and Pb in Pd/Ag solid solutions, as the mole fraction of Ag is varied at temperatures in excess of 800° C. In the case of both Pb and Bi, the Ag/Pd solid solutions were found to be at saturation with 14 at % and 16 at %, respectively. At Ag mole fractions in excess of 60% and 65%, no Bi or Pb solubility, respectively, was found.

However, while the above results show that Ag rich compositions diminish the extent of the interaction between the Ag/Pd and Pb or Bi containing dielectrics, leaching of Pb or Bi from the dielectrics is still observed in practical applications, even though the Ag level exceeds 60%. This is because a local Ag/Pd ratio may not be the same as the initial ratio, due to Ag loss from evaporation through the edges of multilayer ceramic structures or diffusion of Ag into the dielectric ceramic. In addition, the electrode inhomogeneity during firing may also result in difference local Ag/Pd ratios. Both of these effects may reduce the Ag concentration below the 60% level. If however, the initial Ag ratio is more than 80% the aforesaid affects are not experienced (i.e. Pd 20% or greater).

It has also been determined that if Ag/Pd metallization is employed with a ceramic that is a lead-based compound (such as PMN or PZT), that only a Pd/Pb solid solution forms upon co-firing. If, however, the ceramic is not a lead-based compound but rather contains a lead oxide component, then an intermetallic $Pd_3Pb$ forms.

For the case of a lead-based ceramic with Ag/Pd metallization, it has been determined that an inclusion of Pb into the Ag/Pd solid solution to a maximum level of 14 at %, will achieve a Pb saturation of the metallization alloy and will prevent a leaching or other migration of Pb from the underlying ceramic. Such a metallization formulation prevents formation of detrimental interfacial compounds between the metallization and underlying ceramic, and furthermore prevents a depletion of Pb from the ceramic and a resultant change in its permittivity.

For the case of PbO-containing ceramics, it has been found that a metallization comprising a $Pd_3Pb$ intermetallic may be used in lieu of Ag/Pd metallization. The $Pd_3Pb$ intermetallic metallization is lead-saturated so that there is essentially no solubility of Pb therein. Thus, any ceramic containing a large amount of PbO will not see a migration of lead from the ceramic into the $Pd_3Pb$ metallization.

In the case of Bi-containing ceramics, it has been found that an inclusion of up to approximately 16 at % of Bi in the Ag/Pd metallization will "Bi-saturate" the Ag/Pd and prevent subsequent leaching of Bi into the Ag/Pd from a Bi-containing ceramic substrate.

The data presented below enables an understanding of the phase equilibria of Ag/Pd systems with $Bi_2O_3$ or PbO fluxes, and define the conditions under which the bismuth reaction occurs and any potential reactions in the Pd-PbO system.

Hereafter, the term mole ratio and atomic ratio or atomic percent will be used. It is to be understood that mole ratio (%) may not be the same as the atomic ratio (%). For instance, 10 mole % PbO = 10 atomic % PbO, but 10 mole % $Pb_3O_4 \neq 10$ atomic % $Pb_3O_4$. Furthermore, the term lead oxide is meant to include PbO, $PbO_2$, and $Pb_3O_4$, as all react with Pd. Thus, while PbO is considered hereafter, the other forms of lead oxide are also contemplated. Lastly, when the at % of an element is considered, it is expressed as a % of the atomic weights of all included elements in the composition. For instance, a 14 at % of Pb in a solid solution of Ag, Pd and Pb is arrived at considering the sum of the atomic weights of Ag, Pd and Pb.

EXPERIMENTAL

A series of XRD (i.e., X-ray diffraction) and DTA/TGA analyses (i.e., differential thermal analysis/thermal gravimetric analysis) were performed on powder mixtures of Ag/Pd with either $Bi_2O_3$ or PbO, as a function of Ag/Pd ratio and temperature. The pure Pd, Ag, and alloyed 70Ag/30Pd powders used were obtained from Metz Metallurgical Corporation, and the $Bi_2O_3$ and PbO powders from Fisher Scientific (reagent grade). The respective surface areas of these powders were determined to be: Pd: 1.49 $m^2/g$, 0.79 $m^2/g$, 70Ag/30Pd: 1.91 $m^2/g$, $Bi_2O_3$: 0.28 $m^2/g$, and PbO: 0.45 $m^2/g$. Diffraction patterns were collected with a Scintag XRD system using Cu-K$\alpha$ radiation and a Ni filter. The (111), (200), (220), (311), and (222) peaks of Ag/Pd were used for lattice parameter calculations. DTA/TGA analyses up to 1000° C. at 3° C./min were performed using a Harrop DTA/TGA System.

In initial studies, reactions of pure Pd and 70Ag/30Pd alloy metals with $Bi_2O_3$ or PbO were performed on powder mixtures prepared by dry ball milling for 4 h. Molar ratios of 75/25, 50/50 and 25/75 were prepared. Approximately 1 g of the mixture was heated on $Al_2O_3$ setters to temperatures between 300° and 800° C. for 24 h and then quenched. These powders were subsequently ground with a mortar and pestle and then X- rayed. For temperatures >800° C., 0.645-cm (0.25-in) diameter pressed pellets were prepared, heated at 900° and 1000° C. for 1 h, and then quenched. The pellets were then densified. XRD analyses were performed on flat, polished surfaces.

To study the influence of the Ag/Pd ratio on the observed reactions, a series of Ag:Pd mixtures, 10 atomic percent (at %) increments were prepared by mixing the Ag and Pd powders with a mortar and pestle. As confirmed by SEM analysis, the mixing process was purposely mild to prevent significant deformation of the metal particles. The Ag/Pd mixtures were then blended with PbO in molar ratios of 75/25, 50/50, and 25/75 and 86/14. Mixing was achieved by dry ball milling for 4 h. Pressed pellets were also prepared and processed as above.

PHASE FORMATION IN THE Pd:Bi$_2$O$_3$ SYSTEM

XRD results on quenched specimens for the reaction of pure Pd with Bi$_2$O$_3$ as a function of initial Pd:Bi$_2$O$_3$ ratio and temperature are contained in Table 2 below.

TABLE 2

| Tempera- | Phase equilibria between Pd and Bi$_2$O$_3$ | | |
|---|---|---|---|
| ture | 75Pd/25Bi$_2$O$_3$ | 50Pd/50Bi$_2$O$_3$ | 25Pd/75Bi$_2$O$_3$ |
| 300° C. | Bi$_2$O$_3$ + PdO | Bi$_2$O$_3$ + PdO | Bi$_2$O$_3$ + PdO |
| 400° C. | Bi$_2$O$_3$ + PdO | Bi$_2$O$_3$ + PdO | Bi$_2$O$_3$ + PdO |
| 500° C. | PdBi$_2$O$_4$ + PdO | PdBi$_2$O$_4$ | PdBi$_2$O$_4$ + Bi$_2$O$_3$ |
| 600° C. | PdBi$_2$O$_4$ + PdO | PdBi$_2$O$_4$ | PdBi$_2$O$_4$ + Bi$_2$O$_3$ |
| 700° C. | PdBi$_2$O$_4$ + PdO | PdBi$_2$O$_4$ | PdBi$_2$O$_4$ + Bi$_2$O$_3$ |
| 800° C. | PdBi$_2$O$_4$ + PdO | PdBi$_2$O$_4$ | PdBi$_2$O$_4$ + Bi$_2$O$_3$ |
| 900° C. | Bi$_2$O$_3$ + Pd(Bi) | Bi$_2$O$_3$ + Pd(Bi) | Bi$_2$O$_3$ + Pd(Bi) |
| 1000° C. | Bi$_2$O$_3$ + Pd(Bi) | Bi$_2$O$_3$ + Pd(Bi) | Bi$_2$O$_3$ + Pd(Bi) |

XRD results show that for all Pd:Bi$_2$O$_3$ ratios and temperatures less than 500° C., after 24 h, the Pd completely oxidized to PdO.

XRD results further indicate that up to 400° C., there were no interactions between PdO and Bi$_2$O$_3$. For temperatures between 500° and 800° C., the oxides reacted completely to form PdBi$_2$O$_4$. PdBi$_2$O$_4$ is a semiconducting material and crystallizes in the tetragonal structure, with lattice parameters a=8.62 Å and c=5.89 Å. The density of PdBi$_2$O$_4$ is 8.93 [g/cm$^3$], corresponding to four PdBi$_2$O$_4$ formula units in the unit cell. The kinetics of PdBi$_2$O$_4$ formation are slow.

PHASE FORMATION IN THE Pd:PbO SYSTEM

XRD results on quenched specimens for pure Pd with PbO as a function of initial Pd:PbO ratio and temperature are contained in Table 3 below.

TABLE 3

| Tempera- | Phase equilibria between Pd and PbO | | | |
|---|---|---|---|---|
| ture | 86Pd/14PbO | 75Pd/25PbO | 50Pd/50PbO | 25Pd/75PbO |
| 400 | PbO + PdO | PbO + PdO | PbO + PdO | PbO + PdO |
| 500 | PdPbO$_2$ + PdO | PdPbO$_2$ + PdO | PdPbO$_2$ | PdPbO$_2$ + PbO |
| 600 | PdPbO$_2$ + PdO | PdPbO$_2$ + PdO | PdPbO$_2$ | PdPbO$_2$ + PbO |
| 700 | PdPbO$_2$ + PdO | PdPbO$_2$ + PdO | PdPbO$_2$ | PdPbO$_2$ + PbO |
| 800 | PdPbO$_2$ + PdO | PdPbO$_2$ + PdO | PdPbO$_2$ | PdPbO$_2$ + PbO |
| 900 | Pd(Pb) a = 3.96Å | PbPd$_3$ | PbPd$_3$ + PbO | PbPd$_3$ + PbO |
| 1000 | Pd(Pb) a = 3.96Å | PbPd$_3$ | PbPd$_3$ + PbO | PbPd$_3$ + PbO |

The phase formation studies on the Pd:PbO system were very similar to those performed on the Pd:Bi$_2$O$_3$ system in that an intermediate oxide forms, i.e., PdPbO$_2$, which decomposes at a temperature slightly greater than the reduction temperature of PdO, followed by a series of rapid decomposition reactions and subsequent weight loss. For all Pd:PbO ratios at temperatures ≦400° C., after 24 h the Pd completely oxidized to PdO. For all of the Pd:PbO ratios and T≦400° C., no interactions occurred. For temperatures between 500° and 800° C. after a 24 h soak, the oxides reacted completely:

PdO+PbO→PdPbO$_2$

Just as for the Pd:Bi$_2$O$_3$ system, the XRD and DTA/TGA results indicate that a series of reactions occur over a narrow temperature range, in this case from 775° to 850° C. In this system, for the 75/25, 50/50 and 25/75 Ag/Pd ratios, the equilibrium phases at T≧900° C. are an intermetallic PbPd$_3$ phase with PbO for nonstoichiometric ratios. An 86/14 ratio resulted in the formation of an alloy with a=3.96 Å instead of an intermetallic:

3 PdPbO$_2$→3PdO+3PbO→3Pd+3PdO+3/2O$_2$→PbPd$_3$+2PbO+2O$_2$ 0.14PbPdO$_2$+0.72PdO→0.14PbO+0.86PdO→86Pd:14Pb+½O$_2$

70Ag/30Pd with Bi$_2$O$_3$

XRD results for the 70Ag/30Pd—Bi$_2$O$_3$ system as a function of metal/oxide ratio and temperature are given in Table 4.

TABLE 4

| Tem- | Phase equilibria between 70Ag/30Pd alloys and Bi$_2$O$_3$ | | |
|---|---|---|---|
| pera-ture | 75[70Ag/30Pd] 25Bi$_2$O$_3$ | 50[70Ag/30Pd] 50Bi$_2$O$_3$ | 25[70Ag/30Pd] 75Bi$_2$O$_3$ |
| 500° C. | Bi$_2$O$_3$ + PdO Ag(Pd) + PdBi$_2$O$_4$ | Bi$_2$O$_3$ + PdO Ag(Pd) + PdBi$_2$O$_4$ | Bi$_2$O$_3$ + PdO Ag(Pd) + PdBi$_2$O$_4$ |
| 600° C. | Bi$_2$O$_3$ + Ag(Pd) PdBi$_2$O$_4$ | Bi$_2$O$_3$ + Ag(Pd) PdBi$_2$O$_4$ | Bi$_2$O$_3$ + Ag(Pd) PdBi$_2$O$_4$ |
| 700° C. | Ag(Pd) PdBi$_2$O$_4$ | Ag(Pd) + Bi$_2$O$_3$ PdBi$_2$O$_4$ | Ag(Pd) + Bi$_2$O$_3$ PdBi$_2$O$_4$ |
| 800° C. | 70Ag/30Pd Bi$_2$O$_3$ | 70Ag/30Pd) Bi$_2$O$_3$ | 70Ag/30Pd Bi$_2$O$_3$ |
| 900° C. | 70Ag/30Pd Bi$_2$O$_3$ | 70Ag/30Pd) Bi$_2$O$_3$ | 70Ag/30Pd Bi$_2$O$_3$ |

At temperatures up to 500° C., the Ag/Pd alloy partially oxidizes, with subsequent formation of PdO, and its reaction with the Bi$_2$O$_3$ to form PdBi$_2$O$_4$. At 600° C., no PdO is present, having reacted completely with the Bi$_2$O$_3$ present. The temperatures at which PdO and PdBi$_2$O$_4$ are stable are lower than the temperatures of those compounds in pure Pd—Bi$_2$O$_3$ systems. At higher temperatures (>800° C.), XRD peaks corresponding to Ag/Pd in the 70 Ag/30Pd—Bi$_2$O$_3$ mixtures were not shifted compared with those of 70Ag/30Pd metal powders quenched from the same conditions. Only 70Ag/30Pd and Bi$_2$O$_3$ existed.

70Ag/30Pd with PbO

XRD results for the 70Ag/30Pd—PbO system as a function of metal/oxide ratio and temperature are given in Table 5.

TABLE 5

Phase equilibria between 70Ag/30Pd alloys and PbO

| Temperature | 75[70Ag/30Pd] 25PbO | 50[70Ag/30Pd] 50PbO | 25[70Ag/30Pd] 75PbO |
|---|---|---|---|
| 400° C. | PbO + PdO Ag(Pd) | PbO + PdO Ag(Pd) | PbO + PdO Ag(Pd) |
| 500° C. | PdPbO$_2$ + PdO Ag(Pd) | PdPbO$_2$ + PbO Ag(Pd) | PbO + PdPbO$_2$ Ag(Pd) |
| 700° C. | PdPbO$_2$ + PdO Ag(Pd) | PdPbO$_2$ + PbO Ag(Pd) | PbO + PdPbO$_2$ Ag(Pd) |
| 800° C. | 70Ag/30Pd PbO | 70Ag/30Pd PbO | 70Ag/30Pd PbO |
| 900° C. | 70Ag/30Pd PbO | 70Ag/30Pd PbO | 70Ag/30Pd PbO |

In this system, PdPbO$_2$ and PdO were observed over a temperature range of 500° to 700° C. Similar to 70Ag/30PdBi$_2$O$_3$ systems, the temperature at which PdO reduces and PdPbO$_2$ decomposes are lower than those in the pure Pd—PbO systems. At higher temperatures (>800° C.), no intermetallic compounds formed, and only 70Ag/30Pd and PbO was detected.

Examining the results shown above, the following are observed:

1. The temperature stability range for the formation of PdBi$_2$O$_4$ or PdPbO$_2$ corresponds to the stability range of PdO when either pure Pd or a 70Ag/30Pd alloy is mixed with Bi$_2$O$_3$ or PbO.
2. For pure Pd mixed with Bi$_2$O$_3$ or PbO, Pd(Bi), Pd(Pb), or PbPd$_3$ form at high temperatures, but not for the 70Ag/30Pd alloy. Clearly the lower activity of Pd in the alloy prevents such formation.

VARIOUS RATIOS OF Ag/Pd REACTED WITH OXIDES

In order to further understand how the Ag/Pd ratio affects the formation of Pd(Bi) or Pd(Pb) solid solutions, or intermetallic compounds, various ratios of Ag/Pd were mixed with Bi$_2$O$_3$ or PbO. Ratios of 75/25 an 86/14 (only for PbO) were heated to 900° C., quenched and X-rayed.

It should be noted that the solubility of Bi and Pb in Ag is very limited. According to phase diagrams of Ag—Bi and Ag—Pb systems, a maximum of 0.5 and 1.1 at % Bi and Pb dissolve in Ag. There was no evidence of any shift in the lattice parameters due to the dissolution of Bi or Pb when Ag was mixed with PbO and then soaked at 900° C. for 4 h. This permits an examination of the affect of the Ag/Pd ratio on the "bismuth reaction" without considering PbO—Ag or Bi$_2$O$_3$—Ag reactions.

Figure 3:
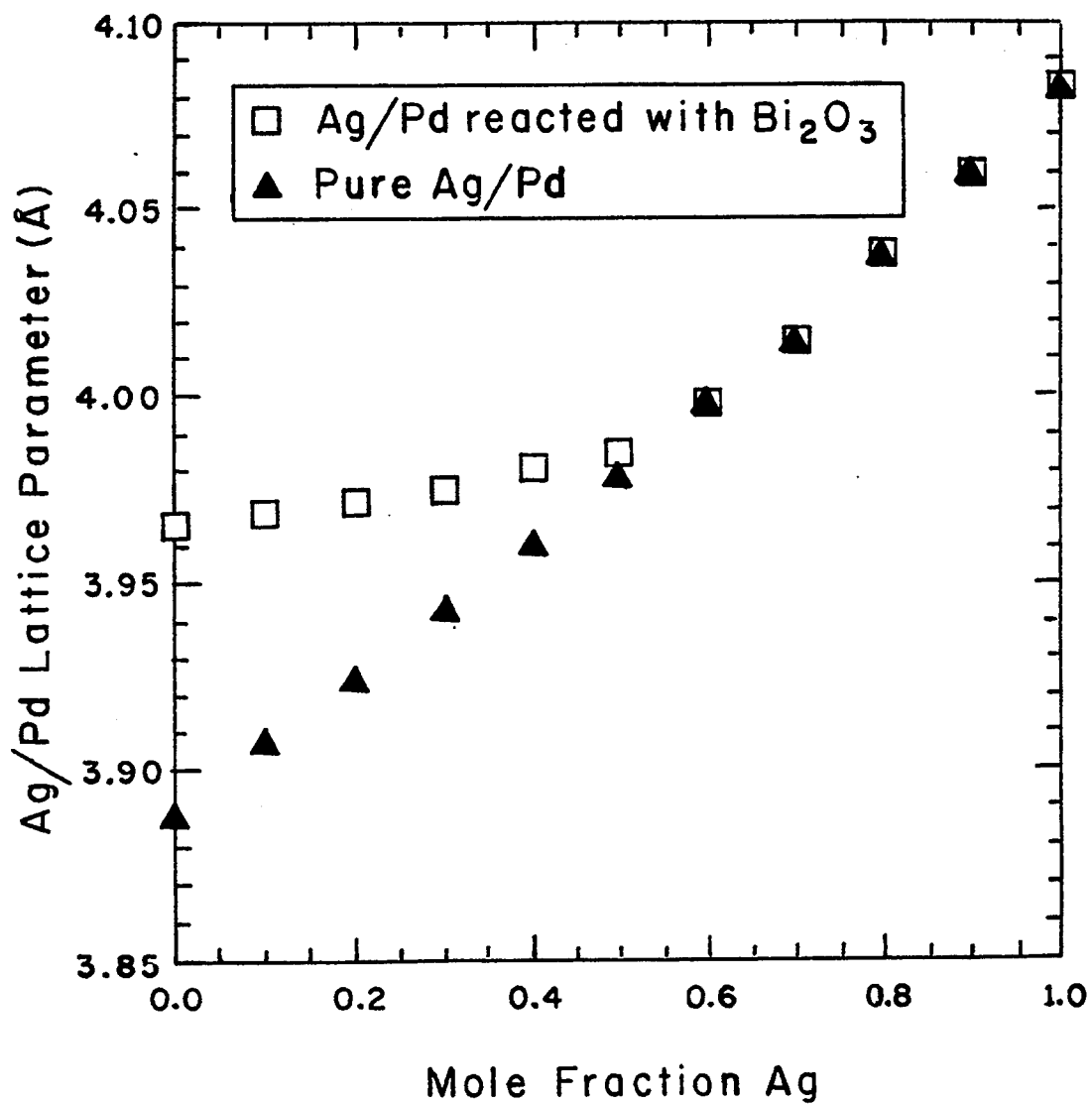
FIG. 3 is a chart which plots lattice parameters of Ag/Pd alloys and Ag/Pd alloys reacted with Bi$_2$O$_3$ quenched from 900° C. wherein the ratio of Pd:Bi$_2$O$_3$=75:25.

A plot of the lattice parameters of various ratios of Ag/Pd mixed with Bi$_2$O$_3$, compared with those of Ag/Pd powders heated and quenched from the same conditions, is shown in FIG. 3. FIG. 3 is a plot of lattice parameter of Ag/Pd alloys and Ag/Pd alloys reacted with Bi$_2$O$_3$ quenched from 900° C. (ratio Pd:Bi$_2$O$_3$=75:25). The lattice parameters of the Ag/Pd alloy exhibit a nearly linear relationship with the Ag/Pd ratio. For Ag/Pd reacted with Bi$_2$O$_3$, the lattice parameter of the alloy is increased for Pd>45% due to Ag/Pd(Bi) formation, and is almost coincident with those of the Ag/Pd alloy for Pd<45%. Clearly a boundary exists that separates regions in which a Ag/Pd(Bi) solid solution or Ag (Pd) —Bi$_2$O$_3$ forms. Whenever the Ag/Pd (Bi) solid solution forms, the lattice parameters of the Ag/Pd alloy increase due to the dissolution of Bi.

Figure 4:
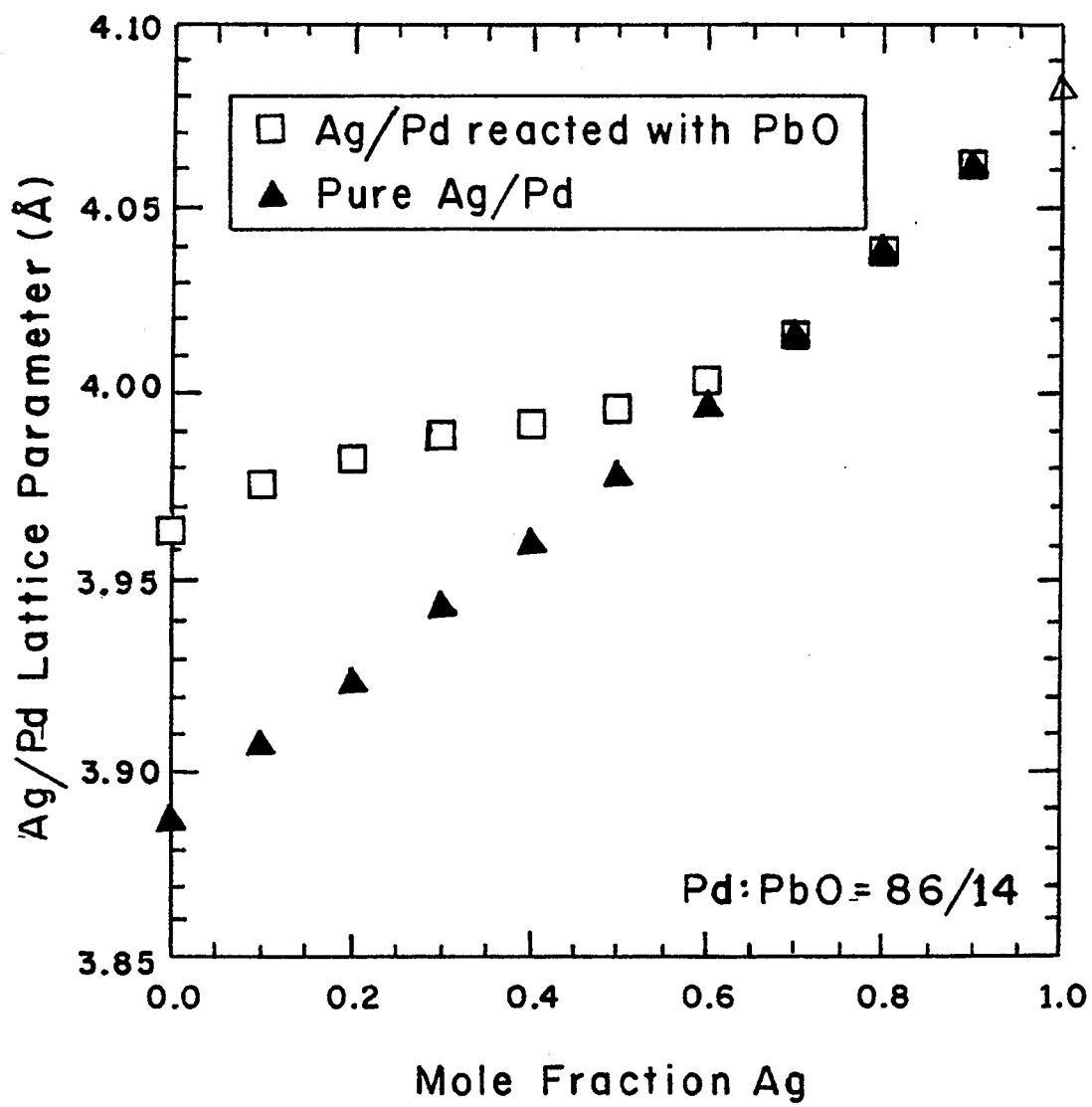
FIG. 4 is a chart of lattice parameters of Ag/Pd alloys and Ag/Pd alloys reactive with PbO quenched from 900° C. (ratio Pd:Pb=86:14)

As with the Ag/Pd—Bi$_2$O$_3$ system, there is a boundary that separates regions in which either Ag (Pd)+Pb forms (Region 3) or in Region 2 where either Ag (Pd)+Pd$_3$Pb or Ag/Pd(Pb) forms. A plot of the lattice parameters of various ratios of Ag/Pd mixed with PbO for a constant Pd/PbO ratio—86/14 compared with that of Ag/Pd, is shown in FIG. 4 (quenched from 900° C.). Further increases in the PbO content result in only a PbPd$_3$ intermetallic formation.

The deviation of the lattice parameter at Pd>40% is due to the formation of Ag/Pd (Pb) solid solution. The Pd(Pb) solid solution does not form by the dissolution of Pb in Ag/Pd if enough PbO is present (PbO/Pd>14/86). Whenever PbPd$_3$ forms, the Pd in Ag/Pd alloy is consumed and thus the Ag/Pd ratio and lattice parameters increase.

Figure 5:
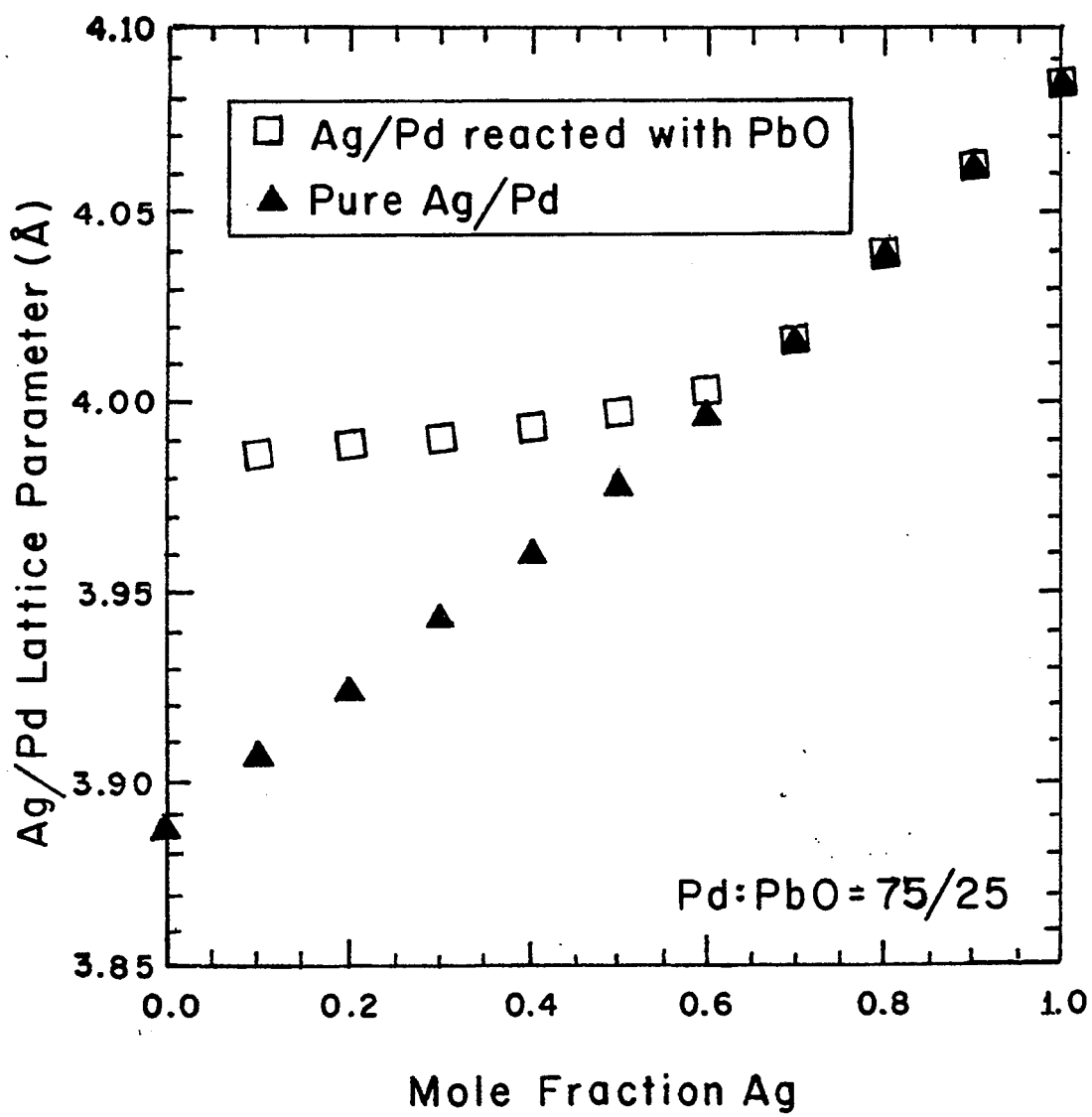
FIG. 5 is a chart of lattice parameters of Ag/Pd alloys, and Ag/Pd alloys reactive with PbO quenched from 900° C.

A plot of the lattice parameters of various ratios of Ag/Pd mixed with PbO in a 75/25 PdO/PbO ratio, compared with those of the pure Ag/Pd alloy (quenched from 900° C.), is shown in FIG. 5. For Pd<40%, the lattice parameter of Ag/Pd mixed with PbO is identical to that of the Ag/Pd alloy. For Pd>40%, the lattice parameter of Ag/Pd is larger, since the PbPd$_3$ forms the Ag/Pd ratio increases. The locations of the boundaries for Ag/Pd(Pb) and PbPd$_3$ formation are consistent.

The above results show that the decomposition temperature of PdO depends on the Ag/Pd ratio and is due to the nonlinear chemical activity of Pd in Ag/Pd alloys. For the 70Ag/30Pd system, the decomposition temperature of PdO is $\approx$675° C. Since the decomposition temperature of PdBi$_2$O$_4$ and PdPbO$_2$ compounds depend on the stability of PdO, they decompose at $\approx$710° C., as confirmed by XRD results.

Figure 6:
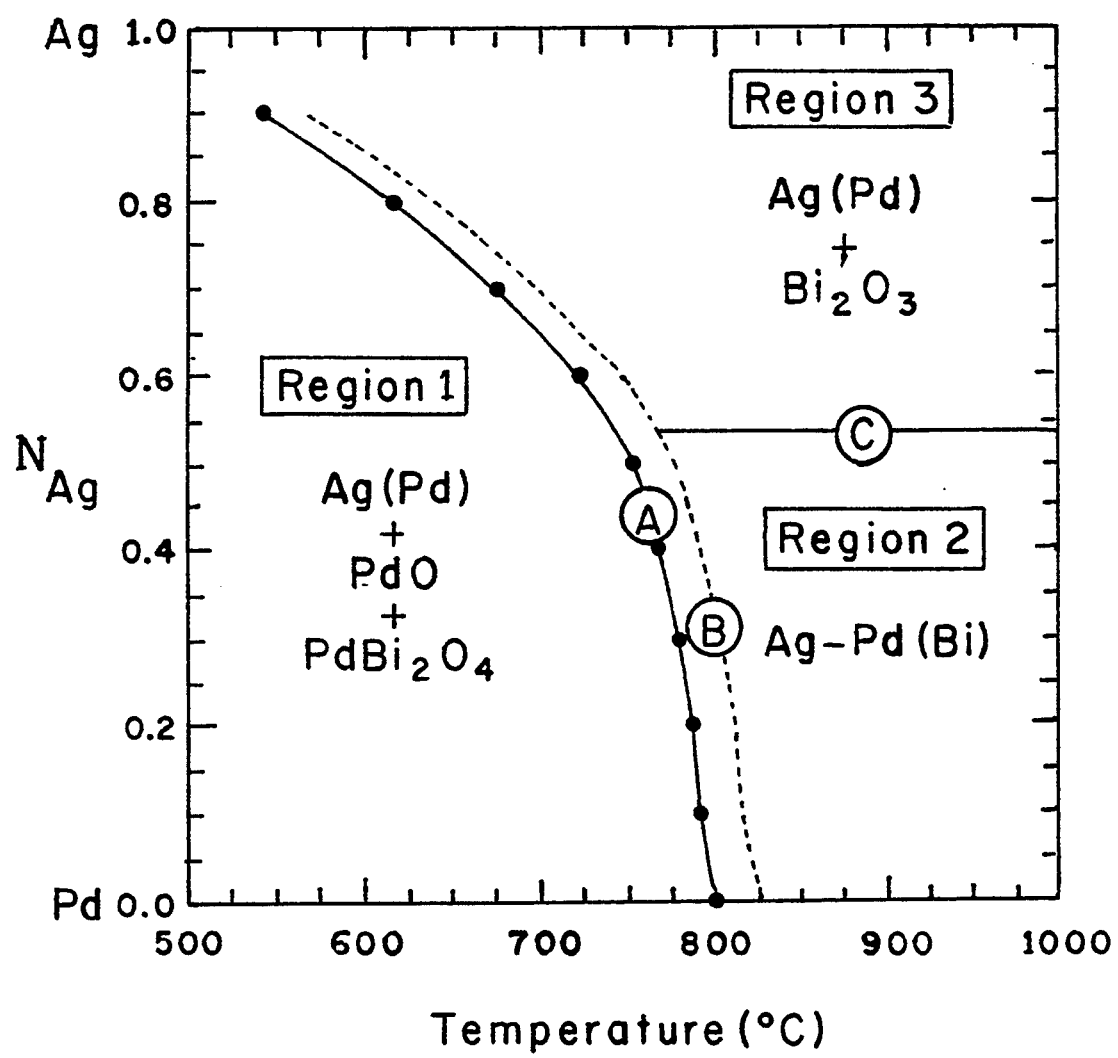
FIG. 6 is a phase diagram illustrating phase relations of the Ag/Pd—Bi$_2$O$_3$—O$_2$ (air) system with variations in temperature.
Figure 7:
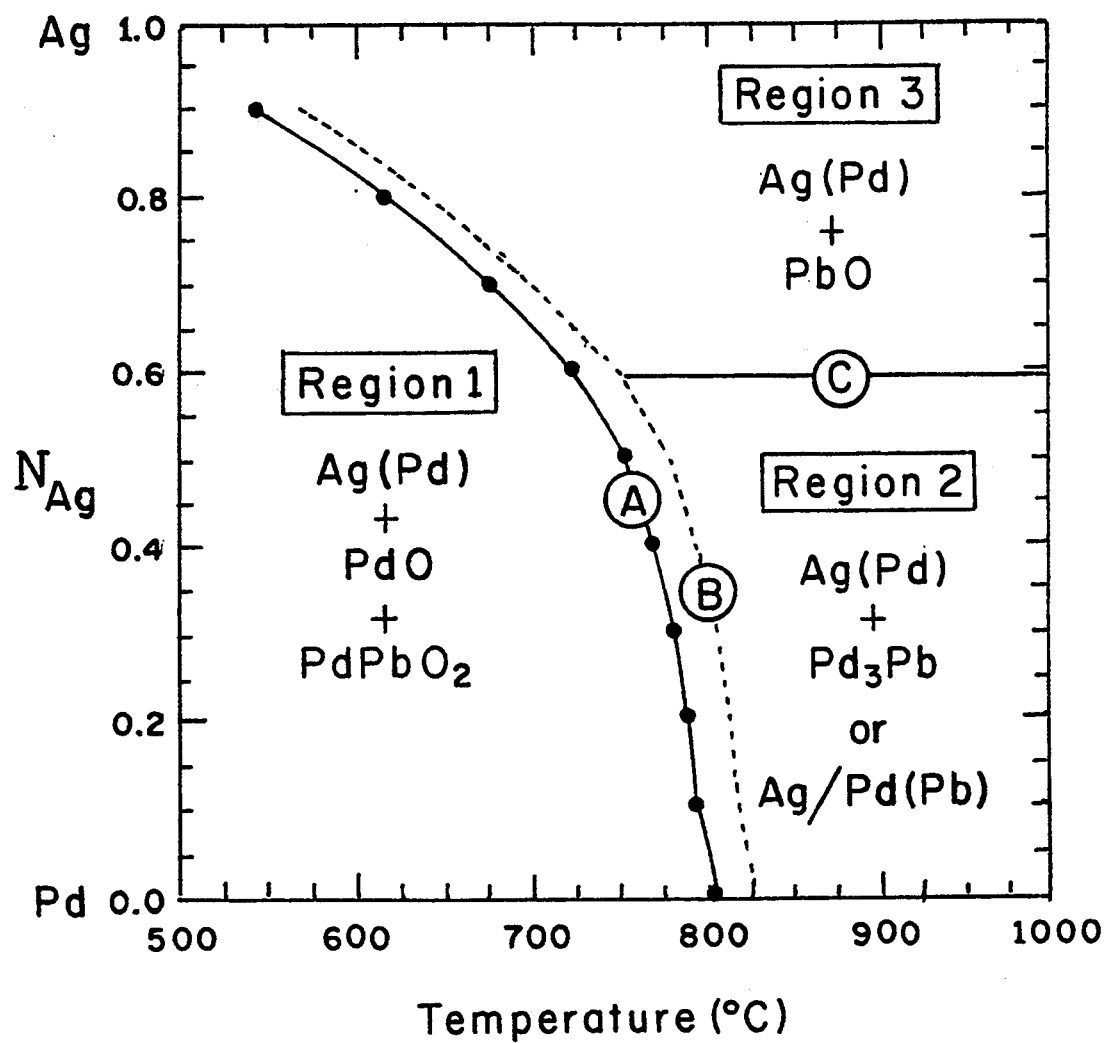
FIG. 7 is a phase diagram illustrating phase relations of the Ag/Pd—PbO—O$_2$ (air) system with variations in temperature.

The phase relations between Ag/Pd—Bi$_2$O$_3$ and Ag/Pd—PbO systems in air have been established and are shown in FIGS. 6 and 7. For region 1 in both systems, PdO and PdBi$_2$O$_4$ or PdPbO$_2$ are stable. The temperature of PdO reduction (line A) and PdBi$_2$O$_4$ and PdPbO$_2$ decomposition (line B) both depend on the Ag/Pd ratio. The decomposition temperatures of PdBi$_2$O$_4$ and PdPbO$_2$ are $\approx$35° C. higher than that of PdO reduction.

In region 2, Ag/Pd(Bi) forms in Ag/Pd—Bi$_2$O$_3$ systems and Pd(Pb) or PbPd$_3$ intermetallic compound forms in Ag/Pd—PbO systems. Formation of these phases will result in oxygen evolution or electrode inhomogeneity. In the Ag/Pd—Bi$_2$O$_3$ system, the maximum solubility of Bi is $\approx$16 at % (26 wt %). Increasing the PbO content (>25 at %) results in a PbPd$_3$ intermetallic formation, and a subsequent increase in the Ag/Pd ratio of the remaining alloy. Importantly, this higher Ag/Pd ratio has a lower melting point, which may also adversely affect the MLC structure.

In region 3, no reactions occur in either the Ag/Pd—Bi$_2$O$_3$ or Ag/Pd—PbO systems. The boundaries (line C) are located at 45 at % Pd and 40 at % Pd.

From the above, chemical reactions that occur between Ag/Pd electrode systems and PbO (as a function of the Ag/Pd ratio and temperature), it was found that:

- ◆ The phases that form during the so-called "bismuth reaction" are PdBi$_2$O$_4$ and a Pd(Bi) alloy. The concentration of Bi in this alloy is $\leq$16%. No Pd$_x$Bi$_y$ intermetallic compounds formed.
- ◆ The phases that form during the "Pb reaction" are PdPbO$_2$, an alloy Pd(Pb), or an intermetallic PbPd$_3$. The alloy only formed if the concentration of Pb was $\leq$14%; higher levels resulted in PbPd$_3$ formation.

XRD and DTA/TGA results have been presented above on the chemical reactions that occur between Ag/Pd electrode systems and $Bi_2O_3$ or PbO. Results showed that the equilibrium phases that formed were directly dependent upon the Ag/Pd ratio and temperature. Phases observed included $PdBi_2O_4$, Pd(Bi), $PdPbO_2$, Pd(Pb) and $PbPd_3$. The $PdBi_2O_4$ and $PdPbO_2$ phases decompose when PdO destabilizes, producing a series of reactions that result in oxygen evolution and partial melting of components. Although the activity of the Pd systematically varied through the Ag/Pd ratios, only pure $Bi_2O_3$ and PbO were studied. The study was expanded to understand the phase relations between Ag/Pd systems and commercially important Bi- or Pb-based oxides.

EXPERIMENTAL

A series of XRD analyses were performed on powder mixtures of Pd or 70Ag/30Pd electrode powders, with Bi- or Pb-based oxides as a function of temperature. From SEM and BET analyses, the particle size and surface of the pure Pd and alloyed 70Ag/30Pd powders used in this study were determined to be: Pd: 2.0 μm, 1.41 m²/g and 70Ag/30Pd: 0.96 μm, 1.91 m²/g. The oxides studied are commonly used as fluxing agents, dielectric modifiers, or active elements. These oxides and their sources were:

| | |
|---|---|
| ◆$Bi_4Ti_3O_{12}$ | Ferro Corporation |
| ◆$Bi_2Ti_2O_7$ | Ferro Corporation |
| ◆$Bi_2(SnO_3)_3$ | Ferro Corporation |
| ◆$Bi_{12}TiO_{20}$ | Mixed oxide synthesis |
| ◆$(Bi_2O_3)_{0.8}(BaO)_{0.2}$ | Mixed oxide synthesis |
| ◆$Pb(Mg_{.33}Nb_{.67})O_3$[PMN] | Columbite technique |
| ◆$(Pb_{1-x}La_x)(Zr_{0.52}Ti_{0.48})O_3$ [PZT] | Ultrasonic Powders, Inc. |
| ◆$PbTiO_3$[PT] | Mixed oxide synthesis |

The powders prepared using the mixed oxide approach were made by wet ball milling appropriate amounts of reagent-grade $Bi_2O_3$, $TiO_2$, PbO, or BaO, followed by calcination at elevated temperatures to obtain the desired oxide. In all cases, XRD was used to confirm the composition.

Reactions of the pure Pd and 70Ag/30Pd alloy metals with the oxides were performed on powder mixtures prepared by dry ball milling for 4 h. Molar ratios of 75/25, and 50/50 were prepared. Approximately 1 g of the mixtures was heated on $Al_2O_3$ or Pt setter at temperatures between 650° and 1200° C. and then quenched. The initial soak time was 24 h for 650° C., but results collected at several soak times indicated that 1 h was sufficient for equilibration to occur. These powders were then ground with a mortar and pestle and X-rayed. Diffraction patterns were collected with a Scintage XRD system using Cu-Kα radiation and a Ni filter. The (111), (200), (220), (311), and (222) peaks of Ag/Pd were used for lattice parameter calculations.

To characterize the effects of the observed chemical reactions on electrical performance, post-fired Du-Pont commercial X7R and Z5U disks were printed with Pt, Pd, or 70Ag/30Pd conductor pastes and then fired at 1100° C. for 1 h. The dielectric properties of sintered samples were measured during cooling from 200° to −150° C. at 1 kHz using an HP 4274 RLC bridge.

PHASE FORMATION BETWEEN PURE Pd and Bi-COMPOUNDS

XRD results on quenched specimens for the reaction of pure Pd with various Bi-compounds as a function of temperature are contained in Table 6 below.

TABLE 6

| | Phase equilibria between Pd and Bi-compounds [Ratio Pd:Bi compound = 75:25] | | | | | |
|---|---|---|---|---|---|---|
| Mixtures 75/25 (at %) | 650° C. | 800° C. | 900° C. | 1000° C. | 1100° C. | 1200° C. |
| Pd/ $Bi_4Ti_3O_{12}$ | No Reaction | No Reaction | No Reaction | Pd(Bi) a = 3.96Å $Bi_2Ti_4O_{11}$ | Pd(Bi) a = 3.96Å $Bi_2Ti_4O_{11}$ | |
| Pd/ $Bi_2Ti_2O_7$ | No Reaction | No Reaction | No Reaction | Pd(Bi) a = 3.95Å $Bi_2Ti_4O_{11}$ | Pd(Bi) a = 3.96Å $Bi_2Ti_4O_{11}$ | |
| Pd/ $Bi_{12}TiO_{20}$ | No Reaction | $PdBi_2O_4$ | Pd(Bi) a = 3.97Å | Pd(Bi) a = 3.98Å | Pd(Bi) a = 3.98Å | |
| Pd/ $Bi_2(SnO_3)_3$ | No Reaction with Pd $Bi_2Sn_2O_7$ + $SnO_2$ | No Reaction with Pd $Bi_2Sn_2O_7$ + $SnO_2$ | No Reaction with Pd $Bi_2Sn_2O_7$ + $SnO_2$ | No Reaction with Pd $Bi_2Sn_2O_7$ + $SnO_2$ | No Reaction with Pd $Bi_2Sn_2O_7$ + $SnO_2$ | Pd(Bi) a = 3.96Å $SnO_2$ |
| Pd/ $(Bi_2O_3)_{0.8}(BaO)_{0.2}$ | $PdBi_2O_4$ | $PdBi_2O_4$ | Pd(Bi) a = 3.96Å | Pd(Bi) a = 3.98Å | Pd(Bi) a = 3.98Å | |

From these results it is observed that although the $Bi_2(SnO_3)_3$ does not react with the Pd until high temperatures, it dissociates during heating to form the pyrochlore $Bi_2Sn_2O_7$ and $SnO_2$. The $(Bi_2O_3)_{0.08}(BaO)_{0.2}$ and $Bi_{12}TiO_{20}$ react with Pd at the lowest temperatures, forming $PdBi_2O_4$. At 900° C., the $PdBi_2O_4$ that has formed is gone, and a Pd(Bi) alloy has formed.

The "Bismuth reaction" reaction may also occur for Ag/Pd metallization co-fired with other Bi-compounds such as $(Bi,Na)_{\frac{1}{2}}TiO_3$, $Bi_2(ZnNb_2)O_9$, $Bi_3(Ni_2Nb)O_9$, and Bi-containing superconducting compounds.

PHASE FORMATION BETWEEN PURE Pd and Pb-COMPOUNDS

XRD results on quenched specimens for the reaction of pure Pd with PMN, PZT, and PT as a function of temperature are contained in Tables 7 and 8 below.

TABLE 7

| | Phase equilibria between Pd and Pb-compounds [Ratio Pd:Pb compound = 75:25] | | |
|---|---|---|---|
| Temperature (°C.) | Mixtures: 75/25 (at %) | | |
| | Pd/ $Pb(Mg_{0.33}Nb_{0.67})O_3$ | Pd/ $Pb(Zr_{0.52}Ti_{0.48})O_3$ | Pd/ $PbTiO_3$ |
| 650 | No Reaction | No Reaction | No Reaction |
| 800 | Pd(Pb), a = 3.94Å $Pb_{1.83}Nb_{1.71}Mg_{.29}O_{.39}$ | No Reaction | No Reaction |
| 900 | Pd(Pb), a = 3.95Å $Pb_{1.83}Nb_{1.71}Mg_{.29}O_{.39}$ | Pd(Pb), a = 3.94Å | Pd(Pb), a = 3.93Å |
| 1000 | Pd(Pb), a = 3.95Å | Pd(Pb), a = 3.95Å | Pd(Pb), a = |

TABLE 7-continued

Phase equilibria between Pd and Pb-compounds
[Ratio Pd:Pb compound = 75:25]

| Temperature (°C.) | Mixtures: 75/25 (at %) | | |
|---|---|---|---|
| | Pd/ Pb(Mg$_{0.33}$Nb$_{0.67}$)O$_3$ | Pd/ Pb(Zr$_{0.52}$Ti$_{0.48}$)O$_3$ | Pd/ PbTiO$_3$ |
| 1100 | Pb$_{1.83}$Nb$_{1.71}$Mg$_{.29}$O$_{.39}$ Pd(Pb), a = 3.95Å | Pd(Pb), a = 3.96Å | 3.94Å Pd(Pb), a = 3.95Å |
| 1200 | Pb$_{1.83}$Nb$_{1.71}$Mg$_{.29}$O$_{.39}$ Pd(Pb), a = 3.95Å Pb$_{1.83}$Nb$_{1.71}$Mg$_{.29}$O$_{.39}$ | Pd(Pb), a = 3.96Å | Pd(Pb), a = 3.96Å |

TABLE 8

Phase equilibria between Pd and Pb-compounds
[Ratio Pd:Pb compound = 50:50]

| Temperature (°C.) | Mixtures: 50/50 (at %) | | |
|---|---|---|---|
| | Pd/ Pb(Mg$_{0.33}$Nb$_{0.67}$)O$_3$ | Pd/ Pb(Zr$_{0.52}$Ti$_{0.48}$)O$_3$ | Pd/ PbTiO$_3$ |
| 650 | No Reaction | No Reaction | No Reaction |
| 800 | Pd(Pb), a = 3.96Å Pb$_{1.83}$Nb$_{1.71}$Mg$_{.29}$O$_{.39}$ | No Reaction | No Reaction |
| 900 | Pd(Pb), a = 3.96Å Pb$_{1.83}$Nb$_{1.71}$Mg$_{.29}$O$_{.39}$ | Pd(Pb), a = 3.95Å | Pd(Pb), a = 3.93Å |
| 1000 | Pd(Pb), a = 3.97Å Pb$_{1.83}$Nb$_{1.71}$Mg$_{.29}$O$_{.39}$ | Pd(Pb), a = 3.96Å | Pd(Pb), a = 3.94Å |
| 1100 | Pd(Pb), a = 3.97Å Pb$_{1.83}$Nb$_{1.71}$Mg$_{.29}$O$_{.39}$ | Pd(Pb), a = 3.97Å | Pd(Pb), a = 3.95Å |
| 1200 | Pd(Pb), a = 3.97Å Pb$_{1.83}$Nb$_{1.71}$Mg$_{.29}$O$_{.39}$ | Pd(Pb), a = 3.97Å | Pd(Pb), a = 3.96Å |

These particular Pb-based electroceramics were chosen due to their importance in many capacitor, transducer and actuator applications, and since they are often co-fired with Ag/Pd electrodes. A Pd(Pb) alloy was found in all cases. No PbPdO$_2$ was formed at 800° C. even though it is stable up to ≈830° C., nor was any intermetallic PbPd$_3$, observed even for the 50:50 ratio. The lattice parameters indicate the maximum solubility of Pb in Pd is attained (i.e., 14 at %). Since all of these compositions sinter at temperatures in excess of 800° C., Pd(Pb) formation is inevitable. The formation of this solid solution indicates that the stoichiometry of the ceramic must be altered. Similar to the reaction of Pd with Bi$_2$O$_3$ and PbO, the reactivity of Pd with Pb-compounds is also dependent upon the Ag/Pd ratio. XRD results for PMN reacted with Pd and 70Ag/30Pd at 900° C. for 1 h show that use of the 70Ag/30Pd alloy prevents Pd(Pb) formation. For Ag/Pd ratios >60/40, the lower activity of Pd diminishes the reactivity of the electrode with Pb or Bi-based dielectrics.

From the above analyses it has been concluded that:
◆For reactions of Pd with Bi-compounds, either PdBi$_2$O$_4$ or a Pd(Bi) alloy forms, depending on the reaction temperature. The Pd(Bi) alloy exhibits maximum solubility of the Bi (i.e., 16 at %).
◆For reactions with Pb-compounds, only a Pd(Pb) alloy formed, but in all instances exhibited the maximum solubility of the Pb(i.e., 14 at %).

These reactions have an adverse effect on the local stoichiometry of the dielectric. Studies on commercial materials shown the use of Pd electrodes decreases the dielectric constant substantially, indicating the formation of a low-permittivity phase in series connectivity with the unaltered dielectric.

Based upon the above results, it has been found that deleterious Pb and Bi migrations into Ag/Pd metallizations from Pb-based and Bi-based dielectrics can be prevented by inclusion in the metallization of Pb or Bi at at %'s of up to 14% and 16% respectively. In the case of dielectrics with large PbO inclusions, use of a Pd$_3$Pb intermetallic metallization will prevent Pb migration from the dielectric.

Although Ag rich (>60%) Ag/Pd metallization may be used for some of the Bi or Pb containing dielectrics which have sintering temperatures less than 1100° C., the leaching of Pb and Bi from the dielectrics is still inevitable. Such effects have been observed by M. H. Megherhi and reported in "Interaction Studies of Lead Magnesium Niobate based Capacitor Materials with Integrated Ceramic Packaging," Ph.D. Thesis, The Pennsylvania State University, 1991, pp 195–222.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A metallization which can be co-fired with a supporting ceramic which includes a Pb compound, said metallization comprising:
   an Ag, Pb and Pd solid solution, said Ag and Pd having a molar ratio wherein said Pd constitutes a percentage of approximately 40% to 100%,
   said Pb present in said solid solution in an amount to exhaust a potential solubility for Pb at said molar ratio and varying from approximately 1.5 to 14 atomic percent as said percentage of Pd varies from approximately 40% to 100%.

2. A metallization which can be co-fired with a ceramic substrate having a lead oxide inclusion, said metallization comprising:
   a pd$_3$ Pb-containing intermetallic compound.

3. A metallization which can be co-fired with a ceramic which includes a bismuth compound, said metallization comprising:
   an Ag, Bi and Pd solid solution, said Ag and Pd having a molar ratio wherein said Pd constitutes a percentage of approximately 40% to 100%,
   said Bi present in said solid solution in an amount to exhaust a potential solubility for Bi at said molar ratio and varying from approximately 0.2 to 16 atomic percent as said percentage of Pd varies from approximately 40% to 100%.

4. A lead-based ceramic comprising:
   a substrate consisting of Pb containing dielectric materials; and
   a metallization layer in contact with said substrate and including Ag, Pb and Pd, said Ag and Pd having a molar ratio wherein said Pd constitutes a percentage of approximately 40% to 100%, said Pb present in said metallization layer in an amount to exhaust a potential solubility for Pb at said molar ratio and varying from approximately 1.5 to 14 atomic percent as said percentage of Pd varies from approximately 40% to 100%.

5. A Bi-based ceramic which comprises:
   a substrate including a Bi compound; and
   a metallization layer in contact with said substrate and including Ag, Bi and Pd, said Ag and Pd having a molar ratio wherein said Pd constitutes a percentage of approximately 40% to 100%, said Bi present in said metallization layer in an amount to exhaust a potential solubility for Bi at said molar ratio and varying from approximately 0.2 to 16 atomic percent as said percentage of Pd varies from approximately 40% to 100%.

* * * * *